Figure 1:
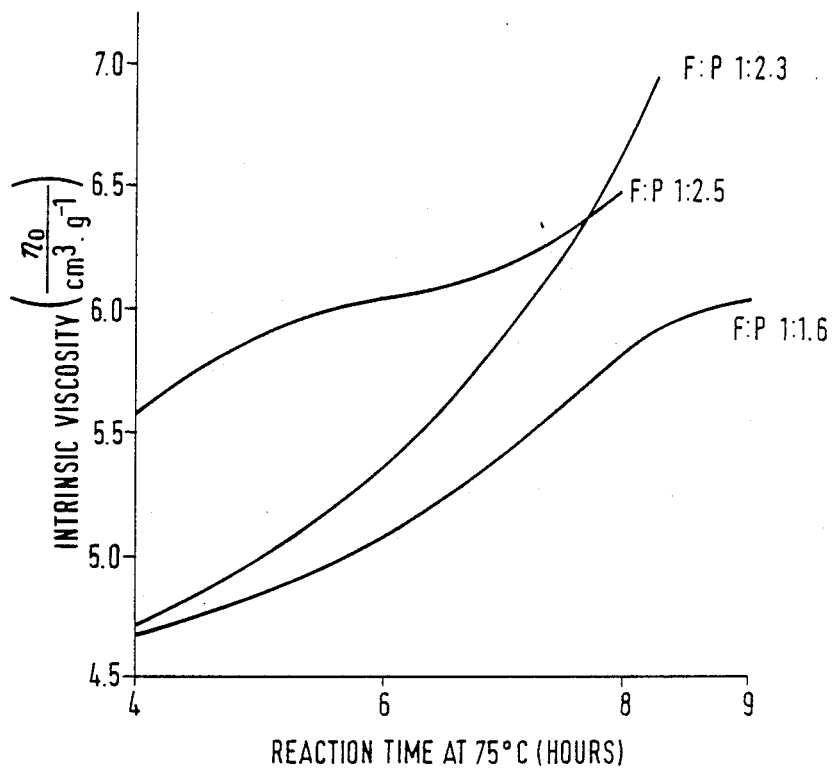

United States Patent [19]

Barker et al.

[11] Patent Number: 4,977,209

[45] Date of Patent: Dec. 11, 1990

[54] PRODUCTION OF ARTICLES OF BONDED PARTICULATE MATERIAL AND BINDER COMPOSITIONS FOR USE THEREIN FROM PHENOL-FORMALDEHYDE AND OXYANION

[75] Inventors: Sidney A. Barker; Neil Baggett, both of Birmingham; John Stevenson; Raymond D. George, both of Sutton Coldfield; David R. De Courcy, Birmingham; Timothy Hammond, Stockton-On-Tees; Martin Bradley, Solihull, all of United Kingdom

[73] Assignee: Foseco International Limited, Birmingham, England

[21] Appl. No.: 280,313

[22] Filed: Dec. 6, 1988

[30] Foreign Application Priority Data

Dec. 24, 1987 [GB] United Kingdom ............... 8730159
Jul. 6, 1988 [GB] United Kingdom ............... 8816106

[51] Int. Cl.$^5$ .................... C08L 61/06; C08L 8/28; C08K 3/38; C08K 5/56
[52] U.S. Cl. ................... 524/594; 524/443; 524/596; 525/506; 528/138; 528/139
[58] Field of Search ............ 524/443, 594, 596; 525/506; 528/138, 139

[56] References Cited

U.S. PATENT DOCUMENTS 2,889,241 6/1959 Gregory et al. ............... 524/15
4,584,329 4/1986 Gardziella et al. ............ 523/145

FOREIGN PATENT DOCUMENTS 0606302 2/1985 Japan .
0966678 9/1964 United Kingdom .

Primary Examiner—Merrell C. Cashion, Jr.
Assistant Examiner—Carlos Azpuru
Attorney, Agent, or Firm—Nixon & Vanderhye

[57] ABSTRACT

A binder composition for producing articles of bonded particulate material such as foundry moulds or cones comprises an alkaline aqueous solution of a resol phenol-aldehyde resin and an oxyanion capable of forming a stable complex with the resin the amount of alkali present in the solution being sufficient to substantially prevent stable complex formation. Bonded articles are produced from mixtures of particulate material and the binder composition by passing carbon dioxide gas through the formed articles whereby the oxyanion forms a stable complex with the resin and the resin is cured. The oxyanion may be for example borate, stannate or aluminate.

22 Claims, 2 Drawing Sheets

PRODUCTION OF ARTICLES OF BONDED PARTICULATE MATERIAL AND BINDER COMPOSITIONS FOR USE THEREIN FROM PHENOL-FORMALDEHYDE AND OXYANION

This invention relates to the production of articles of bonded particulate material and binder compositions for use therein.

The invention will be described with particular reference to the production of foundry moulds or cores.

It is known from British patent application No. 2037787A to produce foundry moulds or cores from sand and a binder, which can be cured by carbon dioxide gas, consisting of an alcohol-soluble phenolic resin, a polyvalent metal hydroxide (such as calcium hydroxide) and/or oxide, an organic solvent (such as methanol or ethanol), an alkali metal hydroxide and water. Such a binder system is disadvantageous because, since the polyvalent metal hydroxide and/or oxide is a powder, metering of the amount added to the sand is difficult to control and the reactivity of the powder is a function of its particle size. When the binder is in contact with carbon dioxide gas the polyvalent metal (e.g. calcium) ions are solubilised and cause crosslinking of the phenolic resin molecules. Such binders tend to harden slowly in the absence of air and more rapidly when allowed to stand in contact with air.

It is further known from U.S. Pat. No. 2,889,241 to use an aqueous alkaline thermosetting phenol-formaldehyde resin solution to which has been added a boron-oxygen compound such as boric acid, an alkali metal borate or ammonium borate as an adhesive in the manufacture of plywood. In use the adhesive is cured by the action of heat.

It is further known from Japanese Patent Publication No. 60-6302 to use as a binder for refractory materials a polyvinyl alcohol modified, base catalysed phenol-formaldehyde resin and to harden the resin at room temperature using boric acid and/or a tetraborate as hardener.

It is further known from U.S. Pat. No. 4,584,329 to make a hardenable moulding mass using a phenol-formaldehyde resin binder containing a boric acid compound. The boric acid compound may be incorporated in the resin binder during condensation of the resin or the resin binder may be ground with the boric acid compound.

It is further known from British Patent No. 966678 to condense a phenol with a source of formaldehyde in contact with a borate of zinc or other bivalent metal as catalyst.

According to the present invention there is provided a binder composition comprising an alkaline aqueous solution of a resol of phenol-aldehyde resin and an oxyanion capable of forming a stable complex with the resin the amount of alkali present in the solution being sufficient to substantially prevent stable complex formation between the resin and the oxyanion.

According to a further feature of the invention there is provided a process for the production of an article of bonded particulate material comprising forming to a desired shape a mixture of particulate material and a binder composition comprising an alkaline aqueous solution of a resol phenol-aldehyde resin and an oxyanion capable of forming a stable complex with the resin and passing carbon dioxide gas through the formed shape so as to cause the oxyanion to form a stable complex with the resin and thereby to cure the resin.

The oxyanions present in the binder composition act as cross-linking agents for the resin by forming complexes with adjacent resol phenol-aldehyde chains and the cross-linking action of the oxyanions is promoted by the carbon dioxide gas which is passed through the article formed of particulate material and the binder composition. As a result much larger, more highly cross-linked resol phenol-aldehyde molecules are formed and the resin is cured. The exact mechanism by which the carbon dioxide promotes curing of the resin is not certain but the carbon dioxide forms carbonic acid by reaction with water in the binder composition, thus lowering the pH of the binder and the oxyanions form stable complexes with the resin molecules at the reduced pH. The alkalinity of the binder composition must be such that the oxyanions remain largely in the uncomplexed state. Complexing and hence curing of the resin on the passage of carbon dioxide takes place when the pH is reduced.

The preferred resol phenol-aldehyde resin is one which contains predominantly molecules in which adjacent phenolic residues are linked together by methylene groups forming bridges between the ortho and para positions because such molecules have a large number of sites for complexing with the oxyanions. Molecules in which the phenolic residues are linked by ortho-ortho methylene bridges have very few sites for complexing with oxyanions, (in the case of a linear molecule only one site at each end), and it is therefore desirable that such molecules are absent, or that they are present in the resin in relatively small numbers. Resins containing molecules having phenolic residues linked by a combination of ortho-para methylene bridges and ortho-ortho may be used but are less preferred.

In order to maximise the number of sites for oxyanion complexing all the available positions on the phenolic residues which are ortho to the phenolic hydroxyl group in an ortho-para methylene bridged molecule should be methylolated.

The phenol which is used to produce the resol phenol-aldehyde resin is preferably one which produces a condensation product when reacted with an aldehyde having the highest possible number of ortho-methylol groups The preferred phenol is phenol itself. Substituted phenols such as p-cresol or m-cresol, or phenolic compounds such as p-phenol sulphonic acids may be used, either on their own or in a combination with phenol, but these produce resins which give inferior results compared to the results given by resins produced from phenol itself. P-cresol for example, can only form phenol-aldehyde molecules in which the phenolic residues are linked by ortho-ortho methylene bridges and the molecules can therefore only complex with the oxyanions at their ends.

The aldehyde may be for example, formaldehyde, butyraldehyde, glyoxal or furfuraldehyde Formaldehyde is preferred.

The resol phenol-aldehyde resin is preferably produced by the condensation of the phenol and the aldehyde in the presence of a base catalyst which may be for example ammonium hydroxide or an alkali metal hydroxide such as sodium hydroxide or potassium hydroxide. Alkali metal hydroxide catalysts are preferred because they produce a resin in which the phenolic residues are linked predominantly by ortho-para or para-para methylene bridges and from which phenolic residues linked by ortho-ortho methylene bridges are essentially absent.

Other catalysts, such as zinc acetate, may be used, either on their own or in combination with an alkali metal hydroxide. However, catalysts such as zinc acetate are less desirable because they yield resins having a mixed bridging structure containing ortho-ortho benzylic ether bridges and ortho-para methylene bridges, and hence a reduced capacity for complexing with the oxyanions.

The mole ratio of aldehyde (expressed as formaldehyde) to phenol in the resin may be in the range of from 1:1 to 3:1 but is preferably in the range from 1.6:1 to 2.5:1.

The resol phenol-aldehyde resin used in the process and binder composition of the invention preferably has an intrinsic viscosity in the range of from 4.0 to 7.5 $cm^3 \cdot g^{-1}$ more preferably in the range of from 4.5 to 7.0 $cm^3 \cdot g^{-1}$.

The viscosity of a liquid is its resistance to flow and when measured by flow of the liquid through a capillary the viscosity is given by the formula.

$$\eta = \frac{P\pi r^4 t}{8Vl}$$

where $\eta$ is the viscosity and t is the time taken for a volume V to pass through a capillary of length 1 and radius r at an external pressure P.

When using a given capillary with the same volume of liquid passing through, and liquids of similar density, the viscosity is directly proportional to the flow time. Thus for a solution of a resin in a solvent the specific viscosity $\eta$ sp is defined as $$\eta sp = \frac{\eta \text{solution} - \eta \text{solvent}}{\eta \text{solvent}} = \frac{ts - to}{to}$$

where $\eta$ solution is the viscosity of the resin solution, $\eta$ solvent is the viscosity of the solvent used to dissolve the resin, ts is the flow time of the resin solution and to is the flow time of the solvent.

The specific viscosity of the resin is dependent on its concentration according to the formula $$\frac{\eta sp}{c} = \eta_o + Ac + Bc^2 + \ldots$$

where c is the concentration of the resin in the solution, A and B are constants and $\eta_o$ is the intrinsic viscosity. If the specific viscosities of a series of solutions of different concentrations are measured and a graph of $\eta$ sp/c against c is plotted, a straight line is obtained the intercept on the $\eta$ s/c axis being the intrinsic viscosity of the resin.

After production the resol phenol-aldehyde resin is made alkaline by the addition of, for example, sodium hydroxide or potassium hydroxide, which is conveniently added as an aqueous solution. The preferred alkali is potassium hydroxide because it results in a binder composition having a lower viscosity for a given degree of polymerisation of the resin compared to sodium hydroxide and the performance of the binder composition is superior.

The molar ratio of the total alkali present in the binder (expressed as hydroxyl ions) to phenol is preferably in the range of 0.5:1 to 3.0:1, more preferably 1.5:1 to 2.5:1. The total alkali includes any alkali used as catalyst in the synthesis of the resin, any additional alkali which may be added during the synthesis and alkali added after synthesis of the resin and during manufacture of the binder.

Examples of suitable oxyanions for use in the process and binder composition of the invention include borate, stannate and aluminate ions. Borate ions are preferred.

The oxyanion may be introduced into the binder composition by the addition of for example alkali metal oxyanion salts such as sodium tetraborate decahydrate, potassium tetraborate tetrahydrate, sodium metaborate, sodium pentaborate, sodium stannate trihydrate or sodium aluminate, or an ammonium oxyanion salt such as ammonium borate. Borate ions may also be introduced by the addition of boric acid or they may be formed by reaction between added boric oxide and alkali in the binder solution.

The mole ratio of oxyanions (expressed as boron, tin etc.) to phenol is preferably in the range of from 0.1:1 to 1:1. When the oxyanion is borate the mole ratio of boron to phenol is more preferably in the range of from 0.3:1 to 0.6:1.

The binder composition preferably also contains a silane such as gamma-aminopropyltriethoxysilane, phenol trimethoxysilane or gammaglycidoxypropyltrimethoxysilane usually in an amount of 0.2% to 1.0% by weight.

If desired an additional solvent such as methanol or ethanol may be included in the binder composition.

Although other methods may be used the preferred method of manufacturing the binder of the invention is as follows:

Phenol is melted and formaldehyde (as paraformaldehyde) and the alkali metal hydroxide catalyst solution are then added. A resol phenol-formaldehyde is then produced by polymerisation of the phenol and formaldehyde in two or more heating stages over a range of temperatures from about 60° C. to about 95° C. The degree of polymerisation of the resin is monitored by measuring the viscosity of a diluted sample of the resin towards the end of the process. The final resin is cooled, alkali is added as alkali metal hydroxide solution and the oxyanions are added. The binder composition obtained is finally cooled and the silane added.

When the binder composition is used to produce foundry moulds or cores from particulate refractory materials the particulate refractory material may be selected from any such materials known for that use. Examples of suitable materials include silica, olivine, chromite and zircon sands.

The quantity of binder composition used will usually be from 1% to 10% by weight, preferably 1.5% to 5% by weight based on the weight of the particulate refractory material.

By means of the process of the invention foundry moulds and cores may be produced, ready for use in metal casting, in a very short time.

The following examples will serve to illustrate the invention:

EXAMPLE 1

A series of five resol phenol-formaldehyde resins was synthesized having an increasing molar ratio of formaldehyde to phenol (F:P) ranging from 3.0:1 to 2.0:1 using sodium hydroxide as catalyst. The compositions of the resins are tabulated in Table 1 below.

TABLE 1

| Component | Mass/g | | | | |
|---|---|---|---|---|---|
| | 1A | 1B | 1C | 1D | 1E |
| Phenol | 800 | 800 | 800 | 800 | 800 |
| 91% w/w para formaldehyde | 284.3 | 364.7 | 348.8 | 701.3 | 841.6 |
| 50% w/w aqueous NaOH | 40.85 | 40.85 | 40.85 | 40.85 | 40.85 |
| Molar F:P | 1.01:1 | 1.3:1 | 1.6:1 | 2.5:1 | 3.0:1 |
| Molar OH⁻:P | 0.06:1 | 0.06:1 | 0.06:1 | 0.06:1 | 0 06:1 |
| % water in starting composition | 4.1 | 4.4 | 4.7 | 5.4 | 5.7 |

The following procedure was used:
1. Charge and melt phenol.
2. Charge paraformaldehyde and sodium hydroxide solution and heat to 65° C. at a rate of 1° C. per minute.
3. Cool to counteract exothermic reaction and maintain at 65° C. for 1 hour.
4. Heat to 75° C. at a rate of 1° C. per minute.
5. Maintain at 75° C. for 30 minutes.
6. Heat to 85° C. at a rate of 1° C. per minute.
7. Maintain at 85° C.

The resins were maintained at 85° C. for sufficient time for each of them to reach the same viscosity range of 4000–6000 cps at 25° C. measured using Paint Research Association Bubble Viscosity Tubes on a 25 g sample diluted with 15 g of 50% w/w potassium hydroxide solution. Resin 1A was maintained at 85° C. for 320 minutes, resin 1B for minutes, resin 1C for 240 minutes, resin 1D for 170 minutes and resin 1E for 150 minutes.

The base resins were used to produce a series of binders of different alkalinity as shown in Table 2 below.

TABLE 2

| Binder | F:P Molar Ratio | Mass/g | | | |
|---|---|---|---|---|---|
| | | Base Resin | 50% w/w KOH | Borax | A1102 Silane |
| 1 AA | 1.01:1 | 25 | 30 | 5.0 | 0.39 |
| 1 AB | | 25 | 35 | 5.0 | 0.39 |
| 1 AC | | 25 | 40 | 5.0 | 0.39 |
| 1 BA | 1.3:1 | 25 | 30 | 5.0 | 0.39 |
| 1 BB | | 25 | 35 | 5.0 | 0.39 |
| 1 BC | | 25 | 40 | 5.0 | 0.39 |
| 1 CA | 1.6:1 | 25 | 30 | 5.0 | 0.39 |
| 1 CB | | 25 | 35 | 5.0 | 0.39 |
| 1 CC | | 25 | 40 | 5.0 | 0.39 |
| 1 DA | 2.5:1 | 25 | 30 | 5.0 | 0.39 |
| 1 DB | | 25 | 35 | 5.0 | 0.39 |
| 1 DC | | 25 | 40 | 5.0 | 0.39 |
| 1 EA | 3.0:1 | 25 | 30 | 5.0 | 0.39 |
| 1 EB | | 25 | 35 | 5.0 | 0.39 |
| 1 EC | | 25 | 40 | 5.0 | 0.39 | in each case the required amount of potassium hydroxide solution was added to the base resin, the temperature rise due to exothermic reaction was controlled and the resin was cooled. The borax (sodium tetraborate decahydrate) was added and mixed into the resin until it had dissolved. The silane was then added at a temperature of below 30° C.

The binders were tested as binders for foundry sand using the following procedure: The binder was mixed with 2.0 kg of Chelford 60 sand (AFS Fineness No. 55) and the mixture was used to prepare standard AFS 50 mm × 50 mm diameter cylindrical cores. In each case the quantity of binder used was such that a constant mass (22.72 g) of base resin was deposited on 2 kg of sand. The cores were hardened by the passage of carbon dioxide gas for various times at a temperature of 20–25° C., a 0.35 kg/cm² line pressure and a 6.0 liters per minute flow rate. The compression strength of the hardened cores was measured immediately after gassing on a Ridsdale Universal Compression tester.

The OH⁻:P molar ratio and mass of binder used and the results obtained are tabulated in Table 3 below.

TABLE 3

| Binder | OH⁻:P Molar Ratio | Mass Deposited on sand (g) | Compression Strength (kg.cm⁻²) For Gassing Period (seconds) | | |
|---|---|---|---|---|---|
| | | | 30 | 60 | 120 |
| 1 AA | 1.48:1 | 54.88 | 4.9 | 6.3 | 7.4 |
| 1 AB | 1.71:1 | 59.43 | 4.2 | 5.9 | 7.0 |
| 1 AC | 1.95:1 | 63.97 | 3.4 | 5.0 | 6.4 |
| 1 BA | 1.58:1 | 54.88 | 4.6 | 5.5 | 6.5 |
| 1 BB | 1.83:1 | 59.43 | 4.9 | 5.9 | 7.0 |
| 1 BC | 2.09:1 | 63.97 | 4.2 | 5.5 | 6.2 |
| 1 CA | 1.68:1 | 54.88 | 3.8 | 4.9 | 6.0 |
| 1 CB | 1.95:1 | 59.43 | 4.9 | 6.1 | 7.2 |
| 1 CC | 2.22:1 | 63.97 | 4.4 | 5.0 | .6.2 |
| 1 DA | 2.00:1 | 54.88 | 12.7 | 14.8 | 17.3 |
| 1 DB | 2.32:1 | 59.43 | 14.1 | 17.5 | 18.8 |
| 1 DC | 2.65:1 | 63.97 | 13.8 | 16.0 | 18.0 |
| 1 EA | 2.19:1 | 54.88 | 13.0 | 14.8 | 16.2 |
| 1 EB | 2.54:1 | 59.43 | 14.8 | 16.6 | 18.5 |
| 1 EC | 2.89:1 | 63.97 | 13.7 | 16.1 | 17.3 |

The results show that throughout the range of F:P molar ratios from 1.01:1 to 3.0:1 the resin can be cured by carbon dioxide gas and that there is a marked increase in the compression strength of the cores obtained between a molar ratio of F:P of 1.6:1 and 2.5:1. The results also indicate that the polymer backbone should be fully methylolated for optimum performance. For a methylene bridged polymer the maximum F:P ratio is 2N+1:N where N is the number of phenolic residues per molecule.

At high degrees of polymerisation the maximum formaldehyde incorporation level tends to a F:P ratio of 2.0:1. Very high F:P reaction ratios (of the order of 3.0:1) therefore lead to large amounts of unincorporated formaldehyde and hence reduced masses of useful binder.

EXAMPLE 2

Three series of resol phenol-formaldehyde resins, series 2A, 2B and 2C, having molar ratios of formaldehyde to phenol (F:P) of 1.6:1, 2.3:1 and 2.5:1 respectively were synthesised using a similar procedure to that described in Example 1 but ending at step 5. For each series reaction times at step 5 ranged from 4 to 9 hours.

Series 2A had the same composition as Resin 1C of Example 1 and series 2C had the same composition as Resin 1D of Example 1. Series 2B had the following composition:

| | |
|---|---|
| phenol | 800.00 g |
| 91% w/w paraformaldehyde | 642.20 g |
| 50% w/w sodium hydroxide solution | 40.85 g |
| F:P molar ratio | 2.3:1 |
| OH⁻:P molar ratio | 0.06:1 |
| water in starting composition | 5.2% w/w |

The intrinsic viscosity of each of the resins was determined using the following procedure.

Approximately 3 g of the resin were accurately weighed in a weighing bottle and dissolved in 15 cm$^3$ of methanol. The resulting solution was transferred to a graduated flask and made up to 25 cm$^3$ with methanol. The flask was inverted to thoroughly mix the solution and the added methanol. The weighing bottle was allowed to stand to allow any methanol remaining in it to evaporate and weighed periodically until it had reached constant weight, thus giving an accurate measure of the amount of sample actually used and accounting for any sample left on the surface of the weighing bottle. The difference between the final weight of the bottle and the initial weight was used to calculate the concentration of the sample in the solution. To adjust the sample concentration to give the actual concentration of resin in the solution a quantity of each sample was placed in a pre-weighed weighing bottle and heated at 100° C. until constant weight was achieved. Volatiles were thus driven off and an accurate measure of the percentage of resin in the sample was obtained The concentrations of the sample solutions were adjusted accordingly.

A suspended level Ubbelholde dilution viscometer was used to measure the viscosity of the solutions. Prior to use and before changing samples the viscometer was soaked overnight in concentrated nitric acid, thoroughly washed with filtered distilled water, then with methanol and finally with acetone. The viscometer was then allowed to dry.

The viscometer was submerged in a water bath maintained at 23.80° C. +0.1° C. A chrome-aluminel thermocouple placed inside the viscometer and connected to a chart recorder was used to determine when the temperature of the resin solution had reached the temperature of the water bath and to ensure that during a viscosity measurement the temperature did not vary by more than 0.1° C.

As it was found that the 2.3:1 and 2.5:1 F:P molar ratio resins behaved as polyelectrolytes rather than as uncharged polymer chains due to the presence of hydroxide ions in the resin all samples were neutralised before viscosity determinations were done. To prevent the precipitation of the resin which would occur if aqueous acid solutions were used for neutralisation dry hydrogen chloride gas, passed through concentrated sulphuric acid and over calcium chloride, was bubbled through the solution until the pH was reduced to 7.

5 cm$^3$ of sample were pipetted into the viscometer and once the thermocouple reading was constant a measurement was made by timing the flow time of the sample between the graduations of the viscometer. The measurement was repeated 5 times and the measurements were averaged. The sample solution was then diluted with methanol which was thoroughly mixed with the solution by bubbling nitrogen through the mixture. Measurements were then made and the results averaged. This was repeated so that measurements were made on each resin at four dilutions. Finally the flow time of the solvent methanol was measured at a range of temperatures from 23.70° to 23.90° C. so that the correct value of the flow time for methanol could be used for each flow time of the solution for determining the specific viscosity of the samples.

The 2.3:1 and 2.5:1 F:P molar ratio resin samples were diluted with 2 cm$^3$ of methanol each time the sample was diluted and further measurements were made. In the case of the 1.6:1 F:P molar ratio resins it was found that at low concentrations the solutions began to exhibit polyelectrolyte behaviour. So that the viscometer measurements could be used to produce an accurate value of the specific viscosity, a restricted concentration range was therefore used and each time a sample was diluted 1 cm$^3$ of methanol was used instead of 2 cm$^3$.

For each resin sample at each dilution the specific viscosity (solution flow time minus methanol flow time divided by methanol flow time) was calculated and the intrinsic viscosity for each resin sample was then determined by plotting the specific viscosity divided by the concentration against concentration and extrapolation to zero.

The results obtained in the form of intrinsic viscosity plotted against reaction time at 75° C. (i.e. at step 5 in the resin synthesis procedure) are shown in FIG. 1 of the accompanying diagrammatic drawings.

The series 2B resins which had the widest intrinsic viscosity range were used to produce a series of binder compositions according to the procedure described in Example 1. The composition of the binders is shown in Table 4 below.

TABLE 4

| Binder | Reaction time at 75° C. (Hours) | Base Resin | 50% w/w KOH | Borax | A1102 Silane |
|---|---|---|---|---|---|
| 2 BA | 4 | 25 | 35 | 5.0 | 0.39 |
| 2 BB | 6 | 25 | 35 | 5.0 | 0.39 |
| 2 BC | 8 | 25 | 35 | 5.0 | 0.39 |
| 2 BD | 9 | 25 | 35 | 5.0 | 0.39 |

Each of the binders was tested using the procedure described in Example 1. In each case the quantity of binder used was such that a constant mass (22.72 g) of base resin was deposited on 2 kg sand, and cores were gassed for 30, 60 and 120 seconds with carbon dioxide.

Figure 2:
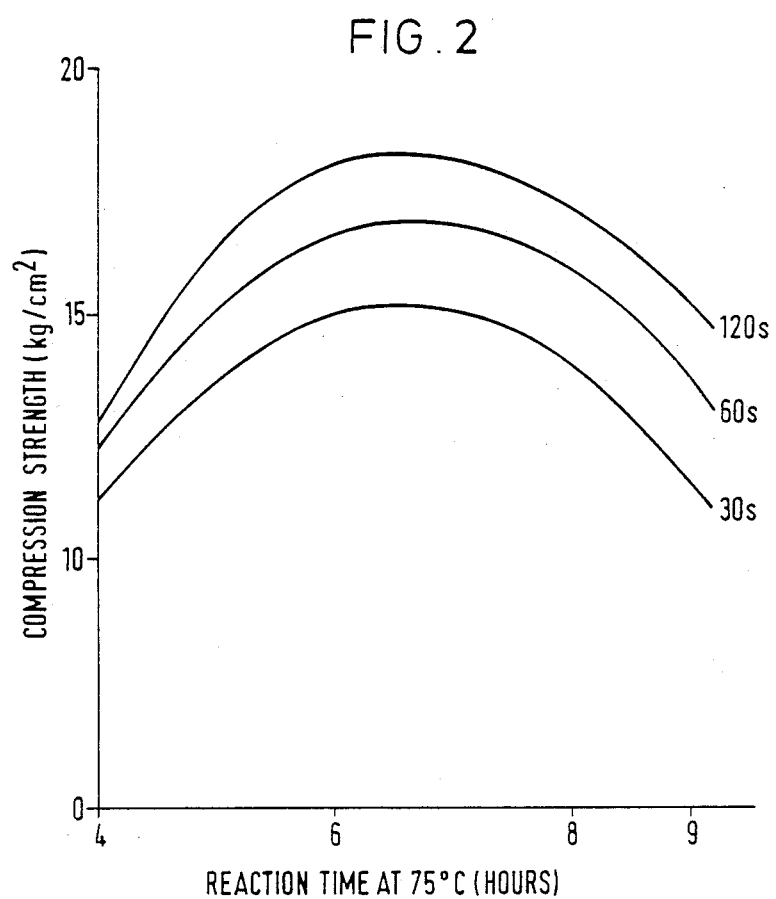

The boron to phenol molar ratio (B:P), the mass of binder used and the results obtained are tabulated in Table 5 below. The results are also shown graphically in FIG. 2 of the drawings in the form of compression strength of the test cores plotted against resin reaction time at 75° C. for three different carbon dioxide gassing times.

TABLE 5

| | Boron: Phenol Molar Ratio | Mass deposited on 2 kg CHELFORD 60 sand | Compression strength/ kg cm$^{-2}$ for Gassing Period | | |
|---|---|---|---|---|---|
| | | | 30s | 60s | 120s |
| 2 BA | 0.36:1 | 59.42 g | 11.5 | 12.5 | 13.0 |
| 2 BB | 0.36:1 | 59.42 g | 15.1 | 17.0 | 18.5 |
| 2 BC | 0.36:1 | 59.42 g | 14.0 | 16.0 | 17.5 |
| 2 BD | 0.36:1 | 59.42 g | 11.5 | 14.0 | 15.4 |

The results indicate that adequate test core compression strength is achieved using resins which have been reacted for between 4 and 9 hours at step 5 in the synthesis procedure, with optimum strengths being obtained using resins which have been reacted for between 5 and 8 hours at step 5. As can be seen from FIG. 1 reaction times at step 5 of 4 to 9 hours correspond to intrinsic viscosities of the resin of about 4.7 to 7.5 cm$^3 \cdot$g$^{-1}$ and reaction times at step 5 of 5 to 8 hours correspond to intrinsic viscosities of about 5.0 to 6.5 cm$^3 \cdot$g$^{-1}$.

EXAMPLE 3

A base resin of the same composition as the series 2B resin of Example 2 was synthesised.

The base resin was synthesised using the procedure described in Example 1 and was maintained at a temperature of 85° C. at step 7 for 190 minutes. The viscosity of the base resin was in the range 4000-6000 cps at 25° C. measured using the procedure described in Example 1.

The base resin was used to produce a series of binders of different levels of alkalinity as shown in Table 6 below.

TABLE 6

| | Mass/g | | | |
|---|---|---|---|---|
| Binder | Base Resin | 50% w/w KOH | Borax | A1102 Silane |
| 3 A | 25 | 15 | 5.0 | 0.39 |
| 3 B | 25 | 20 | 5.0 | 0.39 |
| 3 C | 25 | 25 | 5.0 | 0.39 |
| 3 D | 25 | 30 | 5.0 | 0.39 |
| 3 E | 25 | 35 | 5.0 | 0.39 |
| 3 F | 25 | 40 | 5.0 | 0.39 |
| 3 G | 25 | 45 | 5.0 | 0.39 |
| 3 H | 25 | 50 | 5.0 | 0.39 |

Each of the binders was tested using the procedure described in Example 1. In each case the quantity of binder used was such that a constant mass (22.72 g) of base resin was deposited on 2 kg sand and the cores were gassed for 120 seconds.

The $OH^-$:P ratio and mass of binder used and the results obtained are tabulated in Table 7 below.

TABLE 7

| Binder | $OH^-$:P Ratio | Mass deposited on 2 kg CHELFORD 60 sand | Compression Strength/kg cm$^{-2}$ Gassing Period 120 s |
|---|---|---|---|
| 3 A | 1.00:1 | 41.25 g | 0 |
| 3 B | 1.31:1 | 45.79 g | 0 |
| 3 C | 1.62:1 | 50.33 g | 14.6 |
| 3 D | 1.93:1 | 54.88 g | 18.4 |
| 3 E | 2.25:1 | 59.43 g | 19.1 |
| 3 F | 2.56:1 | 63.97 g | 18.4 |
| 3 G | 2.87:1 | 68.51 g | 19.5 |
| 3 H | 3.18:1 | 73.06 g | 18.2 |

The results indicate that for the particular binder compositions tested $OH^-$:P molar ratios above about 1.8 yield the optimum binder performance.

Binders 3A and 3B were very viscous and formed very "dry" mixtures with sand with the result that the test cores had compression strengths which were too low for any reading to be recorded on the equipment used.

Binders of the same composition as binders 3A and 3B were therefore prepared from a similar base resin and further diluted with water, methanol and/or 50% w/w aqueous potassium hydroxide.

The binders were tested using the procedure described in Example 1. In each case the quantity of binder used was 59.4 g so that 22.72 g base resin were deposited on 2 kg of Chelford 60 sand.

The composition of the binders and the results obtained are tabulated in Table 8 below. Tests were also made using a binder (3K) having the same composition as binder 3E for comparison.

TABLE 8

| | Mass/g | | | | |
|---|---|---|---|---|---|
| COMPOSITION | 3I | 3J | 3K | 3L | 3M |
| Base Resin | 25.0 | 25.0 | 25.0 | 25.0 | 25.0 |
| 50% w/w KOH | 15.0 | 20.0 | 35.0 | 15.0 | 25.0 |
| Water | 20.0 | 15.0 | — | — | — |
| Methanol | — | — | — | 20.0 | 10.0 |
| Borax | 5.0 | 5.0 | 5.0 | 5.0 | 5.0 |
| A1102 Silane | 0.39 | 0.39 | 0.39 | 0.39 | 0.39 |
| GASSING PERIOD | COMPRESSION STRENGTH (Kg.m$^{-2}$) | | | | |
| 30s | 14.8 | 15.8 | 15.8 | 7.4 | 13.7 |
| 60s | 13.5 | 15.6 | 17.0 | 9.1 | 15.1 |
| 120s | 13.5 | 15.8 | 18.5 | 10.5 | 16.6 |

Dilution with water gave compression strengths which were approximately 75-90% of those obtained when diluting with 50% w/w KOH solution. Dilution with methanol gave more viscous binders than those diluted with water. The compression strengths were 60-90% of those obtained when diluting with 50% w/w KOH solution.

EXAMPLE 4

The base resin of Example 3 was used to produce a series of binders of different borate ion contents using the procedure described in Example 1. The composition of the binders is shown in Table 9 below.

TABLE 9

| | Mass/g | | | |
|---|---|---|---|---|
| Binder | Base Resin | 50% KOH | Borax | A1102 Silane |
| 4 A | 25 | 35 | 0 | 0.39 |
| 4 B | 25 | 35 | 2 | 0.39 |
| 4 C | 25 | 35 | 3 | 0.39 |
| 4 D | 25 | 35 | 4 | 0.39 |
| 4 E | 25 | 35 | 5 | 0.39 |
| 4 F | 25 | 35 | 6 | 0.39 |
| 4 G | 25 | 35 | 7 | 0.39 |
| 4 H | 25 | 35 | 8 | 0.39 |
| 4 I | 25 | 35 | 10 | 0.39 |

In each case the borate ions were added as sodium tetraborate decahydrate.

The binders were tested as described in Example 1 and as in Example 1, the quantity of binder used was such that 22.72 g of base resin were deposited on 2 kg of sand.

The boron to phenol molar ratio (B:P), the mass of binder used and the results obtained are tabulated in Table 10 below.

TABLE 10

| Binder | Boron:phenol Molar Ratio | on 2 kg CHELFORD 60 sand | Compression Gassing Period 120 s |
|---|---|---|---|
| 4 A | 0.00:1 | 54.88 g | 0 |
| 4 B | 0.15:1 | 56.70 g | 9.7 |
| 4 C | 0.22:1 | 57.61 g | 14.3 |
| 4 D | 0.29:1 | 58.52 g | 17.0 |
| 4 E | 0.36:1 | 59.43 g | 19.0 |
| 4 F | 0.44:1 | 60.34 g | 18.4 |
| 4 G | 0.51:1 | 61.24 g | 18.1 |
| 4 H | 0.59:1 | 62.16 g | 17.3 |
| 4 I | 0.73:1 | 63.97 g | 16.6 |

The binder containing no borate ions did not cure on gassing with carbon dioxide. The optimum compression strengths were achieved using binders containing a molar ratio of B:P of about 0.3:1 to about 0.6:1.

EXAMPLE 5

The base resin of Example 3 was used to produce a series of binders of different silane contents using the procedure described in Example 1. The composition of the binders is shown in Table 11 below.

TABLE 11

| Binder | Mass/g | | | |
|---|---|---|---|---|
| | Base Resin | 50% KOH | Borax | A1102 Silane |
| 5 A | 25 | 35 | 5.0 | 0.00 |
| 5 B | 25 | 35 | 5.0 | 0.15 |
| 5 C | 25 | 35 | 5.0 | 0.39 |
| 5 D | 25 | 35 | 5.0 | 0.45 |
| 5 E | 25 | 35 | 5.0 | 0.60 |

The binders were tested as described in Example 1 and as in Example 1, the quantity of binder used was such that 22.72 g of base resin were deposited on 2 kg of sand. Three series of tests were carried out for gassing times of 30 seconds, 60 seconds and 120 seconds.

The silane content of the binder and the mass of binder used and the results obtained are tabulated in Table 12 below.

TABLE 12

| Binder | % Silane in binder w/w | Mass deposited on 2 kg CHELFORD 60 sand | Compression Strength/kg cm$^{-2}$ for Gassing Period | | |
|---|---|---|---|---|---|
| | | | 30 s | 60 s | 120 s |
| 5 A | 0.00 | 59.07 g | 4.4 | 5.3 | 6.7 |
| 5 B | 0.23 | 59.21 g | 11.6 | 13.4 | 16.5 |
| 5 C | 0.60 | 59.43 g | 15.4 | 16.7 | 18.5 |
| 5 D | 0.69 | 59.47 g | 15.2 | 18.6 | 19.3 |
| 5 E | 0.91 | 59.62 g | 14.3 | 17.7 | 19.1 |

The addition of silane to the binder produces a considerable improvement in binder performance. High compression strengths were observed for silane addition levels above 0.2% w/w.

EXAMPLE 6

The base resin of Example 3 was used to prepare two binder compositions containing borate ions from two different sources, borax (sodium tetraborate decahydrate) and potassium tetraborate tetrahydrate.

The composition of the binders is shown in Table 13 below.

TABLE 13

| | BINDER 6A | BINDER 6B |
|---|---|---|
| Source of Borate ion | Na$_2$B$_4$O$_7$.10H$_2$O | K$_2$B$_4$O$_7$.4H$_2$O |
| Formula Weight | 381.37 | 305.5 |
| Resin | 25 g | 25 g |
| 50% KOH | 35 g | 35 g |
| Borate ion source | 5.5 g | 4.41 g |
| Silane (A1102) | 0.39 g | 0.39 g |

The binders were tested as described in Example 1 and as in Example 1, the quantity of binder used was such that 22.72 g of base resin were deposited on 2 kg of sand. In each case the quantity of the borate source was such that 0.058 moles of boron were deposited on 2 kg of sand. Thus in each case the same amount of boron was available for complexing.

The mass of binder used and the results obtained are tabulated in Table 14 below.

TABLE 14

| Binder | Source of Borate ion | Mass deposited on 2 kg CHELFORD 60 sand | Compression Strength kg cm$^{-2}$ | | |
|---|---|---|---|---|---|
| | | | 30 s | 60 s | 120 s |
| 6 A | Na$_2$B$_4$O$_7$.10H$_2$O | 59.88 g | 12.2 | 15.7 | 18.1 |
| 6 B | K$_2$B$_4$O$_7$.4H$_2$O | 58.89 g | 14.1 | 16.7 | 17.2 |

Both sodium tetraborate decahydrate and potassium tetraborate tetrahydrate yield similar results when used at equivalent boron addition levels.

EXAMPLE 7

Two series of binders were prepared using the base resin of Example 3, one series containing various amounts of boric acid and the other various amounts of sodium metaborate tetrahydrate. Each binder contained the same amount of potassium hydroxide and the same amount of A1102 silane.

The composition of each of the binders is tabulated in Tables 15 and 16 below.

TABLE 15

| Binder | Mass/g | | | | B:P Molar Ratio |
|---|---|---|---|---|---|
| | Base Resin | 50% KOH | Sodium Metaborate Tetrahydrate | A1102 Silane | |
| 7 A | 25 | 35 | 3.0 | 0.39 | 0.15:1 |
| 7 B | 25 | 35 | 4.0 | 0.39 | 0.20:1 |
| 7 C | 25 | 35 | 5.0 | 0.39 | 0.25:1 |
| 7 D | 25 | 35 | 6.0 | 0.39 | 0.30:1 |
| 7 E | 25 | 35 | 7.0 | 0.39 | 0.35:1 |
| 7 F | 25 | 35 | 8.0 | 0.39 | 0.40:1 |

TABLE 16

| Binder | Mass/g | | | | B:P Molar Ratio |
|---|---|---|---|---|---|
| | Base Resin | 50% KOH | Boric Acid | A1102 Silane | |
| 7 G | 25 | 35 | 1.0 | 0.39 | 0.11:1 |
| 7 H | 25 | 35 | 2.0 | 0.39 | 0.23:1 |
| 7 I | 25 | 35 | 3.0 | 0.39 | 0.34:1 |
| 7 J | 25 | 35 | 4.0 | 0.39 | 0.45:1 |
| 7 K | 25 | 35 | 5.0 | 0.39 | 0.56:1 |
| 7 L | 25 | 35 | 6.0 | 0.39 | 0.68:1 |

The binders were tested as described in Example 1 and as in Example 1, the quantity of binder used was such that 22.72 g of base resin were deposited on 2 kg of sand. A similar binder (7M) containing an optimised level of borax (5.5 g borax, B:P molar ratio 0.40:1) was used as the comparison standard for each series.

The boron to phenol ratio (B:P) and mass of binder used and the results obtained are tabulated in Table 17 below.

TABLE 17

| Binder | B:P Molar Ratio | Mass deposited on 2 kg CHELFORD 60 Sand | Compression Strength/ kg cm$^2$ for Gassing Period | | |
|---|---|---|---|---|---|
| | | | 30 s | 60 s | 120 s |
| 7 A | 0.15:1 | 57.61 | 7.2 | 6.8 | 6.3 |
| 7 B | 0.20.1 | 58.52 | 8.4 | 10.5 | 10.7 |
| 7 C | 0.25:1 | 59.43 | 12.2 | 12.7 | 12.8 |
| 7 D | 0.30:1 | 60.34 | 13.5 | 15.1 | 16.2 |
| 7 E | 0.35:1 | 60.24 | 15.0 | 16.3 | 17.5 |
| 7 F | 0.40:1 | 62.15 | 14.8 | 15.6 | 17.8 |
| 7 M | 0.40:1 | 59.88 | 13.7 | 15.8 | 18.1 |
| 7 G | 0.11:1 | 55.79 | 3.0 | 2.7 | 3.0 |
| 7 H | 0.23:1 | 56.70 | 10.5 | 11.1 | 10.9 |
| 7 I | 0.34:1 | 57.61 | 11.6 | 13.9 | 16.5 |

TABLE 17-continued

| Binder | B:P Molar Ratio | Mass deposited on 2 kg CHELFORD 60 Sand | Compression Strength/ kg cm² for Gassing Period | | |
|---|---|---|---|---|---|
| | | | 30 s | 60 s | 120 s |
| 7 J | 0.45:1 | 58.52 | 11.2 | 11.4 | 13.4 |
| 7 K | 0.56:1 | 59.43 | 9.7 | 10.3 | 12.6 |
| 7 L | 0.68:1 | 60.34 | 9.9 | 12.6 | 12.7 |
| 7 M | 0.40:1 | 59.88 | 12.6 | 15.2 | 17.2 |

From the results obtained in Example 7 and from those obtained in Example 4 it is apparent that the choice of source of borate ions does not significantly affect the strength of the cured resin-bonded sand cores attainable. Although borax-, sodium metaborate tetrahydrate-and boric acid-containing binders show optimum performance at different weight levels of the borate source, the optimum molar B:P ratio for all three sources is comparable.

EXAMPLE 8

The base resin of Example 3 was used to prepare two series of binder compositions, one series containing sodium stannate dihydrate as the source of oxyanions and the other sodium aluminate (Fison technical grade). Two binders containing no oxyanion were also prepared for comparison.

The composition of the binders is shown in Table 18 below.

TABLE 18

| | Mass/g | | | | |
|---|---|---|---|---|---|
| Binder | Base Resin | 50% KOH w/w | Sodium Stannate | Sodium Aluminate | A1102 Silane |
| 8 A | 25 | 35 | 0 | — | 0.39 |
| 8 B | 25 | 35 | 3 | — | 0.39 |
| 8 C | 25 | 35 | 4 | — | 0.39 |
| 8 D | 25 | 35 | 5 | — | 0.39 |
| 8 E | 25 | 35 | 6 | — | 0.39 |
| 8 F | 25 | 35 | 7 | — | 0.39 |
| 8 G | 25 | 35 | — | 0 | 0.39 |
| 8 H | 25 | 35 | — | 3 | 0.39 |
| 8 I | 25 | 35 | — | 4 | 0.39 |
| 8 J | 25 | 35 | — | 5 | 0.39 |
| 8 K | 25 | 35 | — | 6 | 0.39 |
| 8 L | 25 | 35 | — | 7 | 0.39 |

The binders were tested as described in Example 1 and as in Example 1, the quantity of binder used was such that 22.72 g of base resin were deposited on 2 kg of sand.

The Sn:P or Al:P molar ratio and mass of binder used and the results obtained are tabulated in Table 19 below.

TABLE 19

| Binder | Sn:P or Al:P Molar Ratio | Mass deposited 2 kg CHELFORD 60 sand | Compression Strength (Kg.cm⁻²) Gassing period 120s |
|---|---|---|---|
| 8 A | 0.00:1 | 54.88 | 0 |
| 8 B | 0.08:1 | 57.61 | 7.6 |
| 8 C | 0.11:1 | 58.52 | 8.4 |
| 8 D | 0.13:1 | 59.43 | 8.9 |
| 8 E | 0.16:1 | 60.34 | 8.6 |
| 8 F | 0.18:1 | 61.24 | 8.9 |
| 8 G | 0.00.1 | 54.88 | 0 |
| 8 H | 0.22:1 | 57.61 | 4.4 |
| 8 I | 0.29:1 | 58.52 | 5.0 |
| 8 J | 0.36:1 | 59.43 | 5.1 |
| 8 K | 0.44:1 | 60.34 | 5.3 |

TABLE 19-continued

| Binder | Sn:P or Al:P Molar Ratio | Mass deposited 2 kg CHELFORD 60 sand | Compression Strength (Kg.cm⁻²) Gassing period 120s |
|---|---|---|---|
| 8 L | 0.51:1 | 61.24 | 4.9 |

The results show that stannate ions or aluminate ions can be used as alternatives to borate ions in the binder compositions of the invention.

EXAMPLE 9

A resol p-cresol-formaldehyde resin was prepared having a formaldehyde:p-cresol (F:P) molar ratio of 1.5:1. Only low F:p-cresol molar ratios are possible because the para position on the benzene ring in p-cresol is blocked.

The resin had the following composition:

| p-cresol | 800 g |
|---|---|
| 91% w/w paraformaldehyde | 366.3 g |
| 50% w/w sodium hydroxide solution | 40.85 g |
| F:p-cresol molar ratio | 1.5:1 |
| OH⁻:p-cresol molar ratio | 0.07:1 |
| water in starting composition | 4.4% w/w |

The procedure used was that described in Example 1 and at step 7 the resin was maintained at 85° C. for 300 minutes. The viscosity of the resin measured as described in Example 1 was in the range of 3500–5000 cps at 25° C.

The resin was used to prepare a series of binder compositions containing different levels of borate ions as described in Examples 1 and 4. The compositions are tabulated in Table 20 below.

TABLE 20

| | Mass/g | | | |
|---|---|---|---|---|
| Binder | Base Resin | 50% w/w KOH | Borax | A1102 Silane |
| 9 A | 25 | 35 | 0 | 0.39 |
| 9 B | 25 | 35 | 4 | 0.39 |
| 9 C | 25 | 35 | 5 | 0.39 |
| 9 D | 25 | 35 | 6 | 0.39 |
| 9 E | 25 | 35 | 7 | 0.39 |

The binders were tested as described in Example 1. The quantity of binder used was such that 22.72 g of base resin were deposited on 2 kg of Chelford 60 sand and the cores were gassed for 120 seconds with carbon dioxide.

The boron to p-cresol molar ratio (B:P), the mass of binder used and the results obtained are tabulated in Table 21 below.

TABLE 21

| Binder | B:P Molar Ratio | Mass deposited on 2 kg Chelford 60 sand | Compression strength (kg.cm⁻²) Gassing period 120s |
|---|---|---|---|
| 9 A | 0.00:1 | 54.88 | 0 |
| 9 B | 0.27:1 | 58.52 | 6.3 |
| 9 C | 0.33:1 | 59.43 | 7.7 |
| 9 D | 0.40:1 | 60.34 | 7.6 |
| 9 E | 0.47:1 | 61.24 | 6.5 |

Example 9 when compared with Example 4 shows that although useful binders can be obtained from substituted phenols such as p-cresol the properties of the binders are inferior to those of similar binders obtained from phenol due to the fact that the p-cresol-formaldehyde resins contain only ortho-ortho linkages and the molecules can only complex with borate ions at their ends.

EXAMPLE 10

A resol phenol-formaldehyde having the following composition was prepared using zinc acetate dihydrate as catalyst:

| Phenol | 800 g |
| --- | --- |
| 91% w/w paraformaldehyde | 642.2 g |
| zinc acetate dihydrate | 111.9 g |
| water | 6.1 g |
| molar F:P ratio | 2.3:1 |
| molar zinc acetate:P ratio | 0.06:1 |
| % water in starting composition | 5.3 w/w |

The procedure used was as described in Example 1 as far as step 5. Thereafter the resin was heated to 90° C. at a rate of 1° C. per minute and maintained at 90° C. for 270 minutes.

The viscosity of the base resin obtained, measured as described in Example 1, was in the range 3000–5000 cps at 25° C.

The resin was used to prepare a series of binder compositions containing different levels of borate ions as described in Examples 1 and 4. The compositions are tabulated in Table 22 below.

TABLE 22

| Binder | Base Resin | 50% w/w KOH | Borax | A1102 Silane |
| --- | --- | --- | --- | --- |
| | | Mass/g | | |
| 10 A | 25 | 35 | 0 | 0.39 |
| 10 B | 25 | 35 | 4 | 0.39 |
| 10 C | 25 | 35 | 5 | 0.39 |
| 10 D | 25 | 35 | 6 | 0.39 |
| 10 E | 25 | 35 | 7 | 0.39 |

The binders were tested as described in Example 1. The quantity of binder used was such that 22.72 g of base resin were deposited on 2 kg of Chelford 60 sand, and the cores were gassed for 120 seconds with carbon dioxide.

The boron to phenol molar ratio (B:P), the mass of binder used and the results obtained are tabulated in Table 23 below.

TABLE 23

| Binder | B:P Molar Ratio | Mass deposited on 2 kg Chelford 60 sand | Compression strength kg/cm$^{-2}$ Gassing Period 120s. |
| --- | --- | --- | --- |
| 10 A | 0.00:1 | 54.88 g | 0 |
| 10 B | 0.29:1 | 58.52 g | 4.8 |
| 10 C | 0.36:1 | 59.43 g | 5.1 |
| 10 D | 0.44:1 | 60.34 g | 4.3 |
| 10 E | 0.51:1 | 61.24 g | 4.2 |

Example 9 when compared with Example 4 shows that although useful binders can be obtained using zinc acetate catalysed resol phenol-formaldehyde resins the properties of the binders are inferior to those of similar binders obtained using alkali catalysed resol phenol-formaldehyde resins due to the reduced capacity in the zinc acetate catalysed resins for complexing with borate ions.

We claim:

1. A binder composition comprising an alkaline aqueous solution of a resol phenol-aldehyde resin and an oxyanion capable of forming a stable complex with the resin the amount of alkali present in the solution being sufficient to solubilize the resin, and to substantially prevent stable complex formation between the resin and the oxyanion, and the amount of oxyanion present being sufficient to cure the resin when stable complex formation is permitted to take place.

2. A binder composition according to claim 1 wherein the phenol is phenol itself, a substituted phenol such as p-cresol or m-cresol, or a phenolic compound such as p-phenol sulphonic acid.

3. A binder composition according to claim 1 wherein the aldehyde is formaldehyde, butyral/dehyde, glyoxal or furfuraldehyde.

4. A binder composition according to claim 1 wherein the phenol-aldehyde resin is produced by condensation in the presence of a base catalyst.

5. A binder composition according to claim 1 wherein the molar ratio of aldehyde to phenol in the resin is from 1:1 to 3:1.

6. A binder composition according to claim 5 wherein the molar ratio of aldehyde to phenol in the resin is from 1.6:1 to 2.5:1.

7. A binder composition according to claim 1 wherein the phenol-aldehyde resin has an intrinsic viscosity of from 4.0 to 7.5 cm$^3 \cdot$g$^{-1}$.

8. A binder composition according to claim 7 wherein the phenol-aldehyde resin has an intrinsic viscosity of from 4.5 to 7.0 cm$^3 \cdot$g$^{-1}$.

9. A binder composition according to claim 1 wherein the phenol-aldehyde resin contains predominantly molecules in which adjacent phenolic residues are linked together by methylene groups forming bridges between the ortho and para positions.

10. A binder composition according to claim wherein all the available positions on the phenolic residues which are ortho to the phenolic hydroxyl group in an ortho-para methylene bridged molecule are methylolated.

11. A binder composition according to claim 1 wherein the molar ratio of alkali to phenol is from 0.5:1 to 3.0:1.

12. A binder composition according to claim 11 wherein the molar ratio of alkali to phenol is from 1.5:1 to 2.5:1.

13. A binder composition according to claim 1 wherein the oxyanion is borate, stannate or aluminate.

14. A binder composition according to claim 13 wherein the oxyanion is provided by an alkali metal borate, stannate or aluminate.

15. A binder composition according to claim 14 wherein the oxyanion is provided by sodium tetraborate decahydrate, potassium tetraborate tetrahydrate, sodium metaborate, sodium pentaborate, ammonium borate, sodium stannate trihydrate or sodium aluminate.

16. A binder composition according to claim 13 wherein the borate is provided by boric acid.

17. A binder composition according to claim 13 wherein the borate is provided by reaction between boric oxide and alkali present in the binder.

18. A binder composition according to claim 1 wherein the molar ratio of oxyanion (expressed as the element forming the oxyanion with oxygen) to phenol is from 0.1:1 to 1.0:1.

19. A binder composition according to claim 18 wherein the oxyanion is borate and the molar ratio of boron to phenol is from 0.3:1 to 0.6:1.

20. A binder composition according to claim 1 and containing in addition a silane.

21. A binder composition according to claim 20 wherein the silane is gamma-aminopropyltriethoxysilane, phenol trimethoxysilane or gammaglycidoxypropyltrimethoxysilane.

22. A binder composition according to claim 20 wherein the amount of silane present is from 0.25% to 1.0% by weight.

* * * * *